(12) United States Patent
Kang et al.

(10) Patent No.: US 7,873,396 B2
(45) Date of Patent: Jan. 18, 2011

(54) PORTABLE TERMINAL WITH HINGE STOPPER

(75) Inventors: Yi-Tae Kang, Suwon-si (KR); Yong-Jae Kim, Suwon-si (KR); Sang-Gook Kim, Suwon-si (KR); Kwang-Yong Lee, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 766 days.

(21) Appl. No.: 11/765,228

(22) Filed: Jun. 19, 2007

(65) Prior Publication Data

US 2007/0293285 A1      Dec. 20, 2007

(30) Foreign Application Priority Data

Jun. 19, 2006   (KR) .................... 10-2006-0054834

(51) Int. Cl.
*H04M 1/00* (2006.01)

(52) U.S. Cl. .............. 455/575.3; 455/575.7; 455/575.1; 455/90.3; 455/347

(58) Field of Classification Search .............. 455/575.3, 455/347, 90.3, 575.1, 575.7
See application file for complete search history.

(56) References Cited

U.S. PATENT DOCUMENTS 7,283,841 B2 * 10/2007 Luke et al. ............... 455/556.1

2005/0005401 A1   1/2005  Bae
2005/0090296 A1 * 4/2005  Gordecki ................. 455/575.3

FOREIGN PATENT DOCUMENTS

| CN | 1578610 | 2/2005 |
|---|---|---|
| JP | 2001-211017 | 8/2001 |
| KR | 10200400800009 | 9/2004 |
| WO | WO 2005/013585 | 2/2005 |
| WO | WO 2006/022383 | 3/2006 |

* cited by examiner

*Primary Examiner*—Charles N Appiah
*Assistant Examiner*—Kwasi Karikari
(74) *Attorney, Agent, or Firm*—The Farrell Law Firm, LLP

(57) ABSTRACT

A portable terminal is equipped with a first housing, a second housing and a hinge device, the second housing being coupled to one end of the first housing and rotating about a hinge axis extending in a longitudinal direction of the first housing, the hinge device rotatably coupling the first housing and the second housing, the hinge device including: a first hinge base mounted on the first housing or the second housing; a second hinge base mounted on the second housing or the first housing, coupled oppositely to the first hinge base, and rotating about the hinge axis; and a hinge stopper mounted adjacent to the second hinge base, and pivoting around the hinge axis as the second hinge base rotates, wherein the hinge stopper is engaged with the first hinge base in at least one point while the second hinge base rotates, and thus stops rotation of the second hinge base.

16 Claims, 11 Drawing Sheets

PORTABLE TERMINAL WITH HINGE STOPPER

PRIORITY

This application claims priority to an application filed in the Korean Intellectual Property Office on Jun. 19, 2006 and assigned Serial No. 2006-54834, the contents of which are incorporated herein by reference.

BACKGROUND OF THE INVENTION

1. Field of the Invention

The present invention relates to a portable terminal, and more particularly to a hinge device of a portable terminal, which can improve structural stability while rotatably coupling one pair of housings.

2. Description of the Related Art

Generally, a portable terminal refers to an apparatus for providing users with mobile communication functions. Nowadays, a portable terminal is not only used as a simple mobile communication device, but is also used as a device for performing a hybrid function, e.g. a multimedia device for playing music files, moving picture files, etc., or a financial service device for performing retail payment, mobile banking, etc., by using a terminal.

Such a portable terminal may be classified as a bar-type portable terminal, a flip-type portable terminal, a folder-type portable terminal, or a slide type terminal according to its appearance. Slide type terminals account for the bulk of portable terminal markets together with folder-type terminals.

A bar-type terminal has a construction in which an input/output device such as a keypad and a transmitter, a display unit, and an output device such as a receiver are provided in a single housing. All elements capable of using mobile communication functions are provided within the single housing, so the bar-type terminal can be simplified. However, since it is necessary to ensure a constant distance between a transmitter and a receiver for voice communication, the bar-type terminal has a limitation in potential miniaturization.

A flip-type terminal has a construction in which all input/output devices are provided in a single housing with a bar-type terminal, and a flip cover is pivotally attached to the housing so as to prevent fault operations from occurring by closing off an input device such as a keypad in a communication standby mode. However, the flip-type terminal has a limitation in potential miniaturization due to a problem in ensuring the distance between a transmitter and a receiver as with the bar-type terminal.

A folder-type terminal has a construction in which one pair of housings can be folded. An input device and an output device are located in each housing, so the folder-type terminal can be easily miniaturized. Further, since it is possible to easily ensure the distance between a transmitter and a receiver, it has accounted for the bulk of portable terminal markets for a long time.

A slide type terminal has a construction in which one pair of housings can be slid while facing each other. An input device, specifically, a keypad, is covered or uncovered according to sliding of the housings, so that abnormalities can be prevented and the slide type terminal can be easily miniaturized. Such slide type terminals satisfy various users' preferences.

Nowadays, as a Digital Multimedia Broadcasting (DMB) service, etc., is commercialized, a portable terminal can function as a broadcast receiver in addition to a simple communication device and a sound playback device.

However, since conventional portable terminals have been designed based on communication functions, it is inconvenient to watch broadcasting through such portable terminals. That is, a user watches broadcasting for a long time while looking at a display unit. Accordingly, in order to orient the screen display direction to the user-side in the conventional portable terminals, a user must hold the terminal. Further, various types of terminals have been proposed in order to overcome the disadvantages of such conventional portable terminals, but it is difficult to ensure the reliability of these proposed terminals because they are structurally unstable.

SUMMARY OF THE INVENTION

Accordingly, the present invention has been made to solve the above-mentioned problems occurring in the prior art, and it is an object of the present invention to provide a portable terminal with a hinge stopper, which ensures reliability through improvement of structural stability.

It is another object of the present invention to provide a portable terminal with a hinge stopper, which is convenient for watching DMB broadcasting, etc.

In accordance with one aspect of the present invention, there is provided a portable terminal equipped with a first housing, a second housing and a hinge device, the second housing being coupled to one end of the first housing and rotating about a hinge axis extending in a longitudinal direction of the first housing, the hinge device rotatably coupling the first housing and the second housing, the hinge device including: a first hinge base mounted on the first housing or the second housing; a second hinge base mounted on the second housing or the first housing, coupled oppositely to the first hinge base, and rotating about the hinge axis; and a hinge stopper mounted adjacent to the second hinge base, and pivoting around the hinge axis as the second hinge base rotates, wherein the hinge stopper is engaged with the first hinge base in at least one point while the second hinge base rotates, and thus stops rotation of the second hinge base.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings. In the following description, a detailed description of known functions and configurations incorporated herein will be omitted when it may obscure the subject matter of the present invention.

Figure 1:
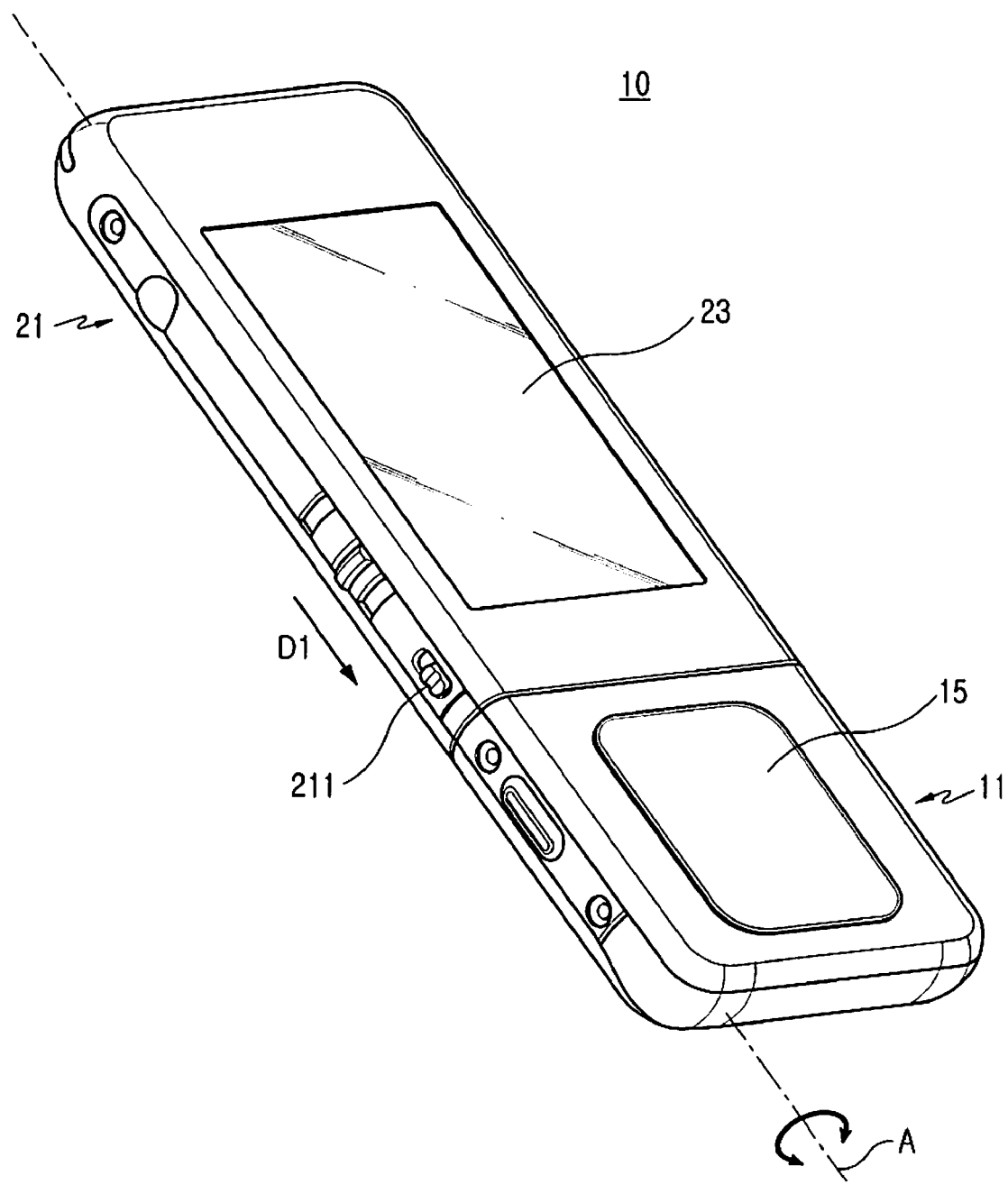
FIG. 1 is a perspective view showing a portable terminal with a hinge stopper according to the present invention.
Figure 2:
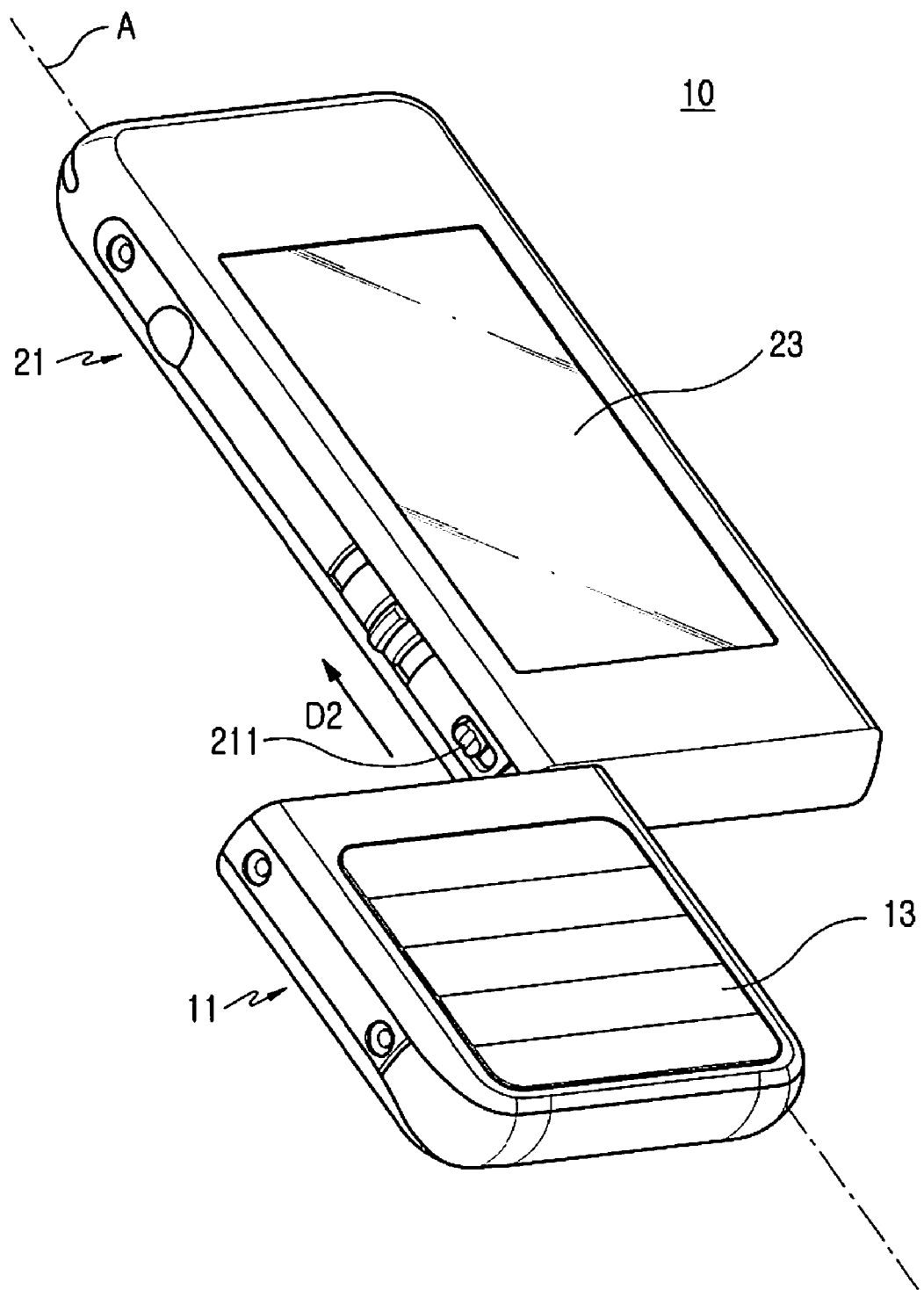
FIG. 2 is a perspective view showing a portable terminal in which one housing has rotated about another housing.
Figure 3:
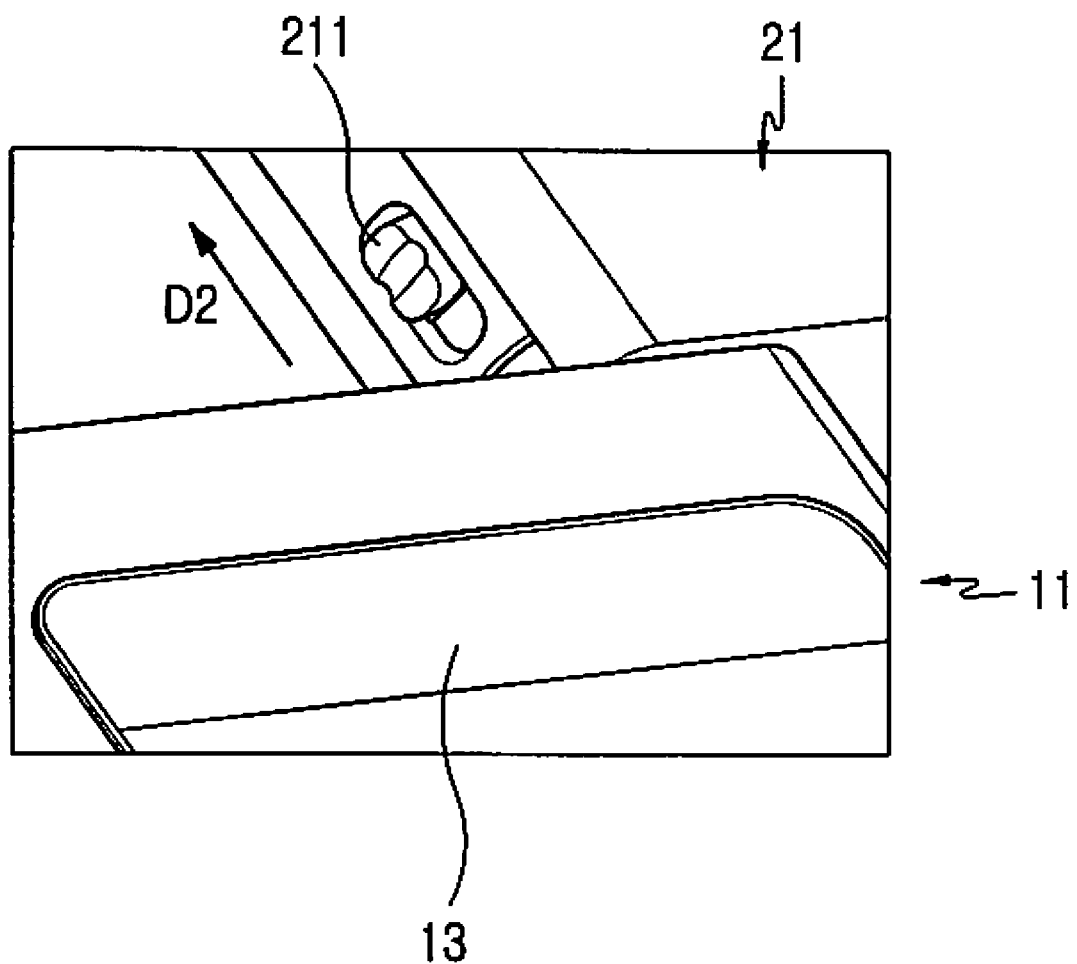
FIG. 3 is an enlarged view of an adjustment knob of the hinge stopper shown in FIG. 2.
Figure 4:
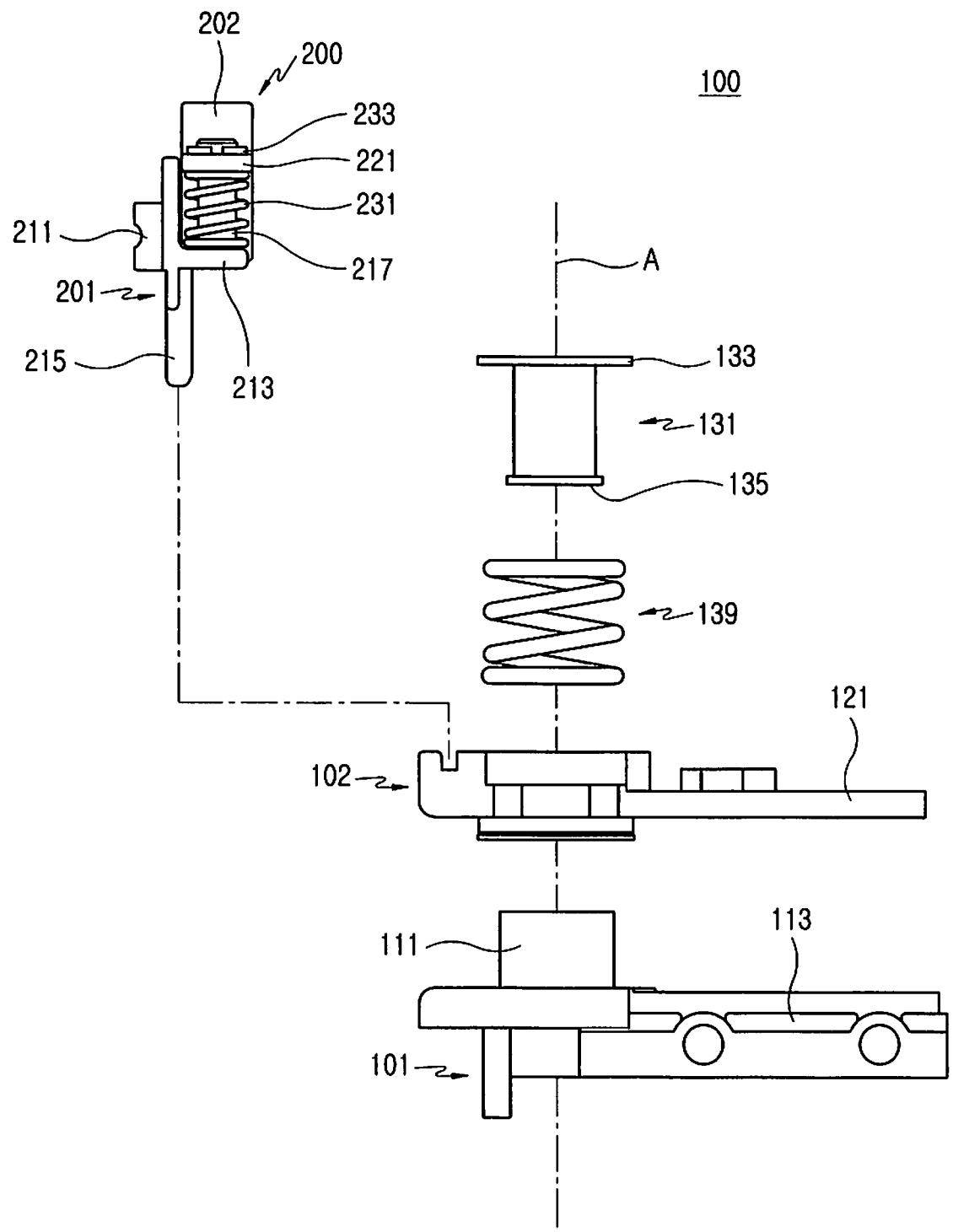
FIG. 4 is an exploded view showing a hinge device of the portable terminal shown in FIG. 1.
Figure 5:
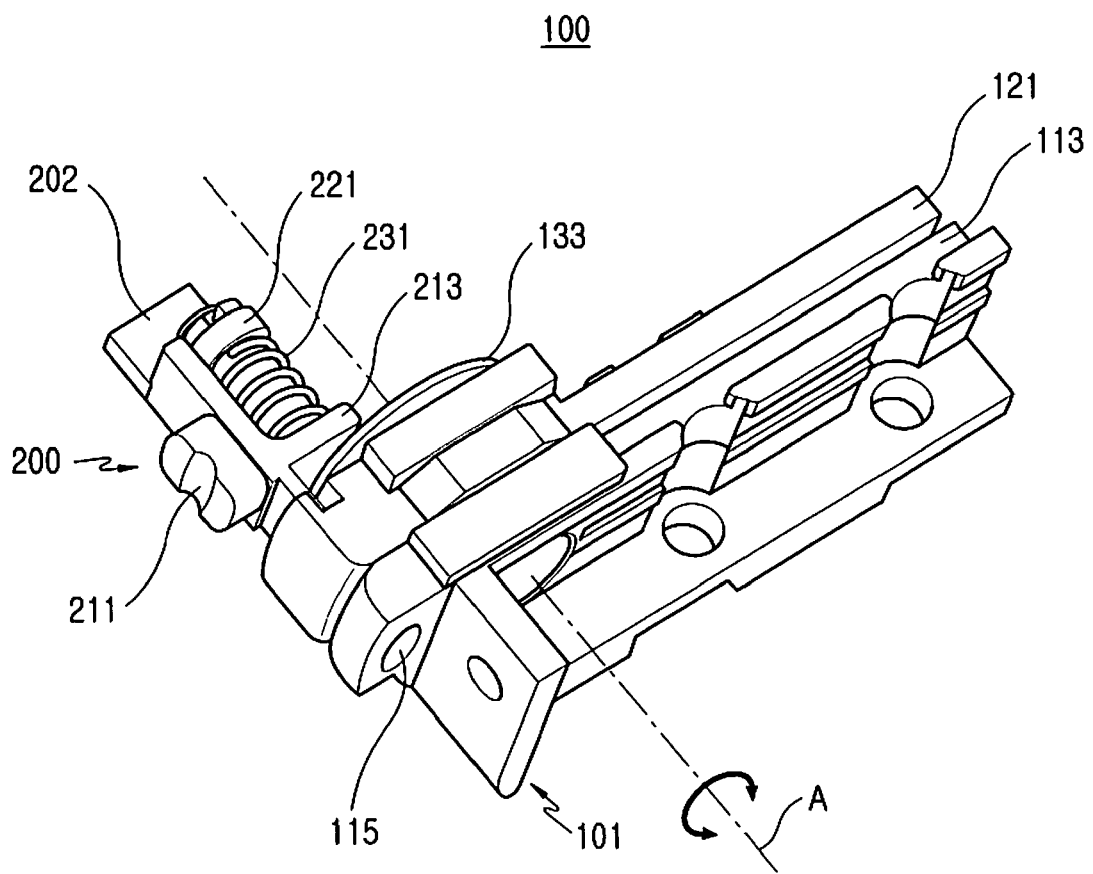
FIG. 5 is a perspective view showing the hinge device shown in FIG. 1.
Figure 6:
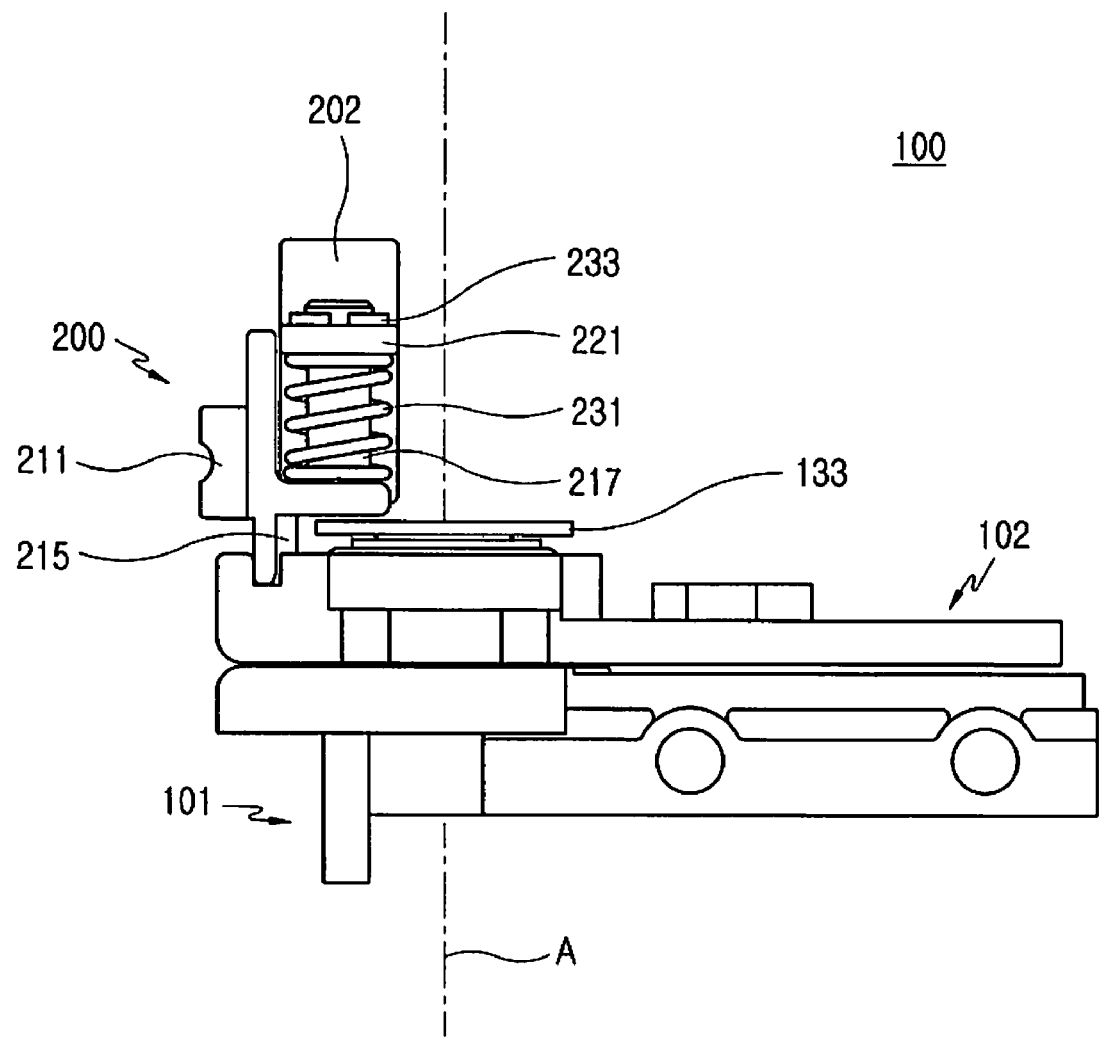
FIG. 6 is a first side view showing the hinge device shown in FIG. 5.
Figure 7:
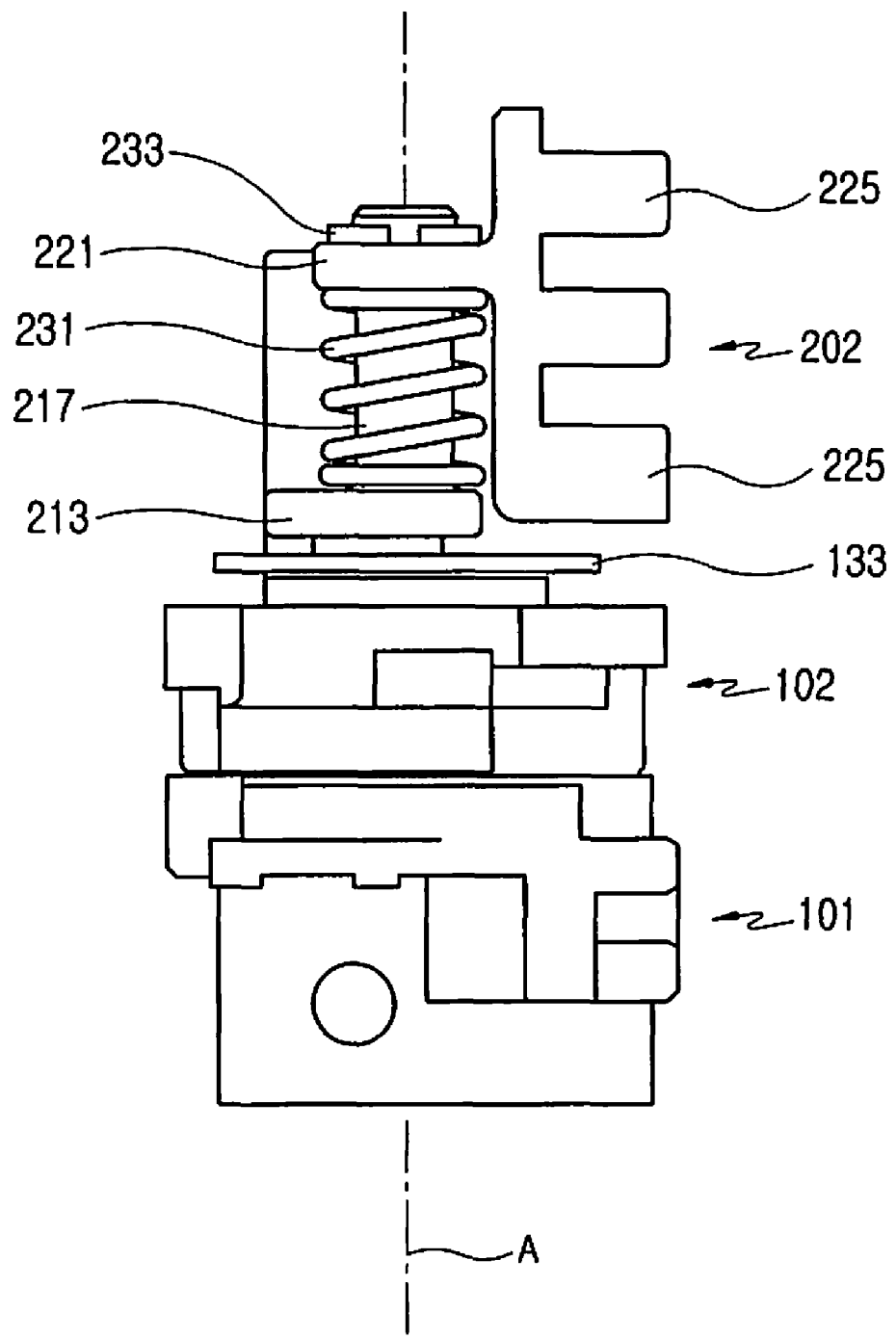
FIG. 7 is a second side view showing the hinge device shown in FIG. 5.

As shown in FIGS. 1 to 3, a portable terminal 10 with a hinge stopper 200 (shown in FIG. 4) according to the present invention includes a first housing 11 and a second housing 21 is coupled to one end of the first housing 11 and rotates with respect to the first housing 11. The first housing 11 is rotatably coupled to the second housing 21 through a hinge device 100 providing a hinge axis A extending in a longitudinal direction of the first housing 11.

The first housing 11 is provided on one side with a navigation key 15 using a pressure sensitive touch pad, and on the other side with a keypad 13 for inputting numerals, characters, etc.

The second housing 21 is coupled to one end of the first housing 11, and is arranged in the longitudinal direction of the first housing 11. As shown in FIG. 2, if the second housing 21 rotates by 180° about the hinge axis A, the first housing 11 is located on one side of the hinge axis A and the second housing 21 is located on the other side of the hinge axis A. The second housing 21 has one side with a display unit 23, and the other side (not shown) with a battery pack or a sub-display unit.

When the sub-display unit has been provided on the other side of the second housing 21, a user can input a communication partner's phone number, character information, etc., by using the keypad 13 and the sub-display unit for voice communication. In order to reduce power consumption in a waiting mode, the display unit 23 maintains an off-state, and can display transmission/reception states, the battery level, current time, reception or non-reception of a message, etc., on the sub-display unit.

The terminal 10 may have a volume adjustment key, a camera device, a shutter button, etc., provided on the sides of the housings 11 and 21.

An adjustment knob 211 of the hinge stopper 200 is attached to the side of the second housing 21. In a state in which the adjustment knob 211 has moved in the direction D1 (shown in FIG. 1), the second housing 21 is restrained from rotating in a stationary state with respect to the first housing 11. In order to cause the second housing 21 to rotate about the hinge axis A, the adjustment knob 211 is moved in the direction D2 (shown in FIG. 2).

Referring to FIGS. 4 to 7, the hinge device 100 rotatably coupling the first and second housings 11 and 21 has a structure in which a first hinge base 101 is rotatably coupled to a second hinge base 102 and the hinge stopper 200 is provided adjacent to the second hinge base 102. The hinge stopper 200 restricts the rotation of the second hinge base 102 depending on the positions of the second hinge base 102. The hinge axis A of the terminal 10 is located on one side of the first and second housings 11 and 21.

A description will be given on the assumption that the first hinge base 101 is mounted on the first housing 11 and the second hinge base 102 is mounted on the second housing 21. However, the first hinge base 101 may be provided on the second housing 21 and the second hinge base 102 may be provided on the first housing 11. It should be noted that the hinge stopper 200 is provided to the second housing 21 while being adjacent to the second hinge base 102, but it may also be provided adjacent to the first housing 11. That is, the second hinge base 102 and the hinge stopper 200 may be provided in the first housing 11 and the first hinge base 101 may be provided in the second housing 21.

The first hinge base 101 includes both a rotation body 111 extending along the hinge axis A, and a locking segment 113 extending in a direction perpendicular to the hinge axis A from the outer circumferential surface of the rotation body 111. The rotation body 111 is coupled to the second hinge base 102 and rotates with respect to the second hinge base 102, which has a cylindrical shape. In addition, the periphery of the rotation body 111 partially protrudes in a direction opposed to the locking segment 113, and a stopper hole 115 (shown in FIG. 5) is formed in the protruding portion. The stopper hole 115 selectively engages with the hinge stopper 200 to restrict the rotation of the second hinge base 102.

The first hinge base 101 may be accommodated in the first housing 11 to be fixed adjacent to one end of the first housing 11, or the outer surface of the first hinge base 101 may partially form one end surface of the first housing 11. That is, the first hinge base 101 may be fixed to the first housing 11 in such a manner that it closes one end surface of the first housing 11. If the first hinge base 101 is fixed to the first housing 11, the rotation body 111 protrudes toward one end of the first hinge base 101.

The second hinge base 102 is mounted on one end of the second housing 21, and rotates about the hinge axis A while facing one end surface of the first housing 11. The second hinge base 102 has a flat board shape extending in a direction perpendicular to the hinge axis A, which provides a different type of locking segment 121 facing the locking segment 113 of the first hinge base 101.

A rotation hole (not shown) surrounding the periphery of the rotation body 111 is formed in the second hinge base 102. The rotation body 111 is coupled through the rotation hole, and supports the rotary motion of the second hinge base 102 while being surrounded by the rotation hole.

The rotation body 111 and the rotation hole are located adjacent to one end of the first hinge base 101 and one end of the second hinge base 102, respectively, and the first hinge base 101 and the second hinge base 102 are located adjacent to one side of the first housing 11 and one side of the second housing 21, respectively, so the hinge axis A is located adjacent to one end of the first housing 11 and one end of the second housing 21.

As the rotation body 111 is rotatably coupled to the rotation hole, the second hinge base 102 faces the first hinge base 101, more precisely, the locking segment 113 of the first hinge base 101.

In order to firmly maintain the connection between the first hinge base 101 and the second hinge base 102 and stabilize the rotation of the second hinge base 102, the hinge device 100 includes a locking member 131 and a first elastic member 139.

The locking member 131 has a cylindrical shape in which a support plate 133 is formed at one end and a fixed plate 135 is formed at the other end, and the other end of the locking member 131 is supported on the first hinge base 101 through the rotation body 111. The fixed plate 135 is supported by the inner side surface of the first hinge base 101 or is fixed to the first hinge base 101 by way of a tight-fit, so the locking member 131 can be coupled to the first hinge base 101.

The first elastic member 139 is wound around the periphery of the locking member 131, which has one end surface supported by the support plate 133, and the other end surface supported by the second hinge base 102. The two end surfaces of the first elastic member 139 are supported by the support plate 133 and the second hinge base 102, respectively, so the first elastic member 139 can provide an elastic force acting in a direction in which the second hinge base 102 comes into close contact with the first hinge base 101.

As the elastic force of the first elastic member 139 acts, the friction force between the first hinge base 101 and the second hinge base 102 increases while the second hinge base 102 rotates, and thus the second hinge base 102 is prevented from optionally moving differently from user's intention.

In addition, the locking member 131 may have a wiring hole (not shown) formed through the hinge axis A. The wiring hole interconnects the inside of the first housing 11 to the inside of the second housing 21, and provides a wiring space of a flexible printed circuit, etc., for connecting circuit devices respectively provided inside the first housing 11 and the second housing 21.

A construction for rotatably coupling the first housing 11 and the second housing 21 can be achieved by using only the first and the second hinge bases 101 and 102, the locking member 131, and the first elastic member 139. In the hinge device 100 excluding the hinge stopper 200, when rotating the second housing 21 about the first housing 11, the rotation of the second housing 21 can be stopped in a certain position, but the stopped state cannot be stably maintained.

That is, in order to maintain a state in which the rotation of the second housing 21 remains stopped, a fixed means corresponding to this can be separately provided, or a sufficient friction force between the first hinge base 101 and the second hinge base 102 can be provided. However, there is a limitation in a method for providing a friction force in terms of the weight of the first housing 11 and the second housing 21 and the structure of the terminal 10.

The hinge stopper 200 provides an additional friction force when the second hinge base 102, i.e. the second housing 21, rotates, and functions as a fixed means for restraining the second housing 21 from rotating in a specific position, e.g. in a state as illustrated in FIG. 1.

Figure 8:
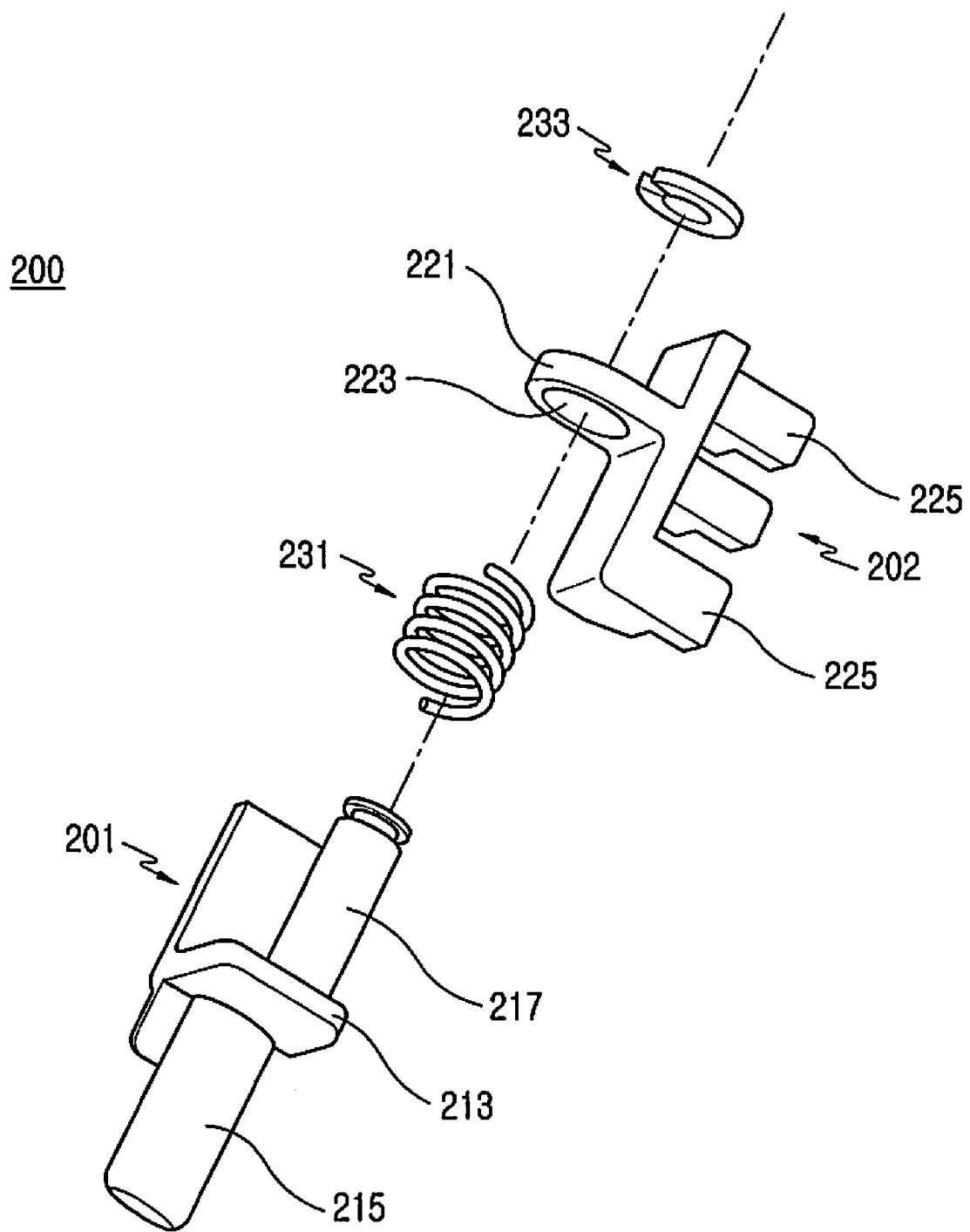
FIG. 8 is an exploded perspective view showing the hinge stopper shown in FIG. 4.

Referring to FIG. 8, the hinge stopper 200 includes a stopper member 201, a support member 202 and a second elastic member 231.

The stopper member 201 includes the adjustment knob 211 (shown in FIG. 4) exposed to the periphery of the first housing 11, a first supporting segment 213, a stopper shaft 215 and a supporting shaft 217.

The first supporting segment 213 extends from the inner side surface of the adjustment knob 211, and the stopper shaft 215 extends along the hinge axis A from one surface of the first supporting segment 213 in a position adjacent to the adjustment knob 211. The supporting shaft 217 extends in a direction opposite to the stopper shaft 215, starting from the other surface of the first supporting segment 213. As a result, the stopper shaft 215 and the supporting shaft 217 each extend in directions away from each other, and extend in parallel with the hinge axis A.

The support member 202 is fixed within the first housing 11, is formed on its one side with a second supporting segment 221 facing the first supporting segment 213, and is formed on the other side with fixed segments 225 extending therefrom. The second supporting segment 221 has a through hole 223 therein, and thus provides a path through which the supporting shaft 217 passes. Although not shown in FIG. 8, structures to be formed-fitted with the fixed segments 225 are formed within the first housing 11, and the fixed segments 225 are interlocked to such structures formed inside of the first housing 11 to provide a means for fixing the support member 202.

The second elastic member 231 is wound around the periphery of the supporting shaft 217, and both ends of which are respectively supported by the first supporting segment 213 and the second supporting segment 221. Simultaneously, the supporting shaft 217 passes through the through hole 223 and is coupled to a C-ring 233 at its own one end. As the C-ring 233 is coupled to the one end of the supporting shaft 217 having passed through the through hole 223, the stopper member 201 is engaged with the support member 202 and linearly reciprocates along the hinge axis A. The second elastic member 231 provides an elastic force for causing the first supporting segment 213 to move farther from the second supporting segment 221.

The hinge stopper 200 having the construction as described above is provided adjacent to the second hinge base 102, and pivots about the hinge axis A if the second hinge base 102 rotates. The stopper shaft 215 provides a friction force by pressing the first hinge base 101 through the second hinge base 102.

As described above, the hinge stopper 200 is engaged with the stopper hole 115 of the first hinge base 101. It is apparent to those skilled in the art that the element actually inserted into the stopper hole 115 is the stopper member 201. That is, as the second hinge base 102 rotates, an end of the stopper member 201 moves along a constant circular arc-shaped trajectory on the first hinge base 101, and thus the stopper hole 115 is formed on a movement trajectory of the stopper member 201.

In a state in which one end surface of the first housing 11 faces one end surface of the second housing 21, the end of the stopper member 201 is engaged with the stopper hole 115. That is, as shown in FIG. 1, in a state in which the second housing 21 is located at one end of the first housing 11 along a longitudinal direction to provide the form of a bar-type terminal, the stopper member 201 is engaged with the stopper hole 115. A user can operate the keypad 13, the navigation key 15, etc., of the terminal 10 or perform voice communication, as in the case of using a general bar-type terminal.

Hereinafter, a position in which one end surface of the first housing 11 is located oppositely to one end surface of the second housing 21 as illustrated in FIG. 1 will be referred to as a first position. Further, a position in which the second hinge base 102 rotates by 180° from the first position, the first housing 11 is located in one side of the hinge axis A, and the second housing 21 is located in the other side of the hinge axis A as shown in FIG. 2 will be referred to as a second position.

As the hinge stopper 200, more precisely. the stopper member 201, presses the first hinge base 101, friction forces occur between the first hinge base 101 and the second hinge base 102 and between the stopper member 201 and the first hinge base 101, respectively, while the second housing 21 and the second hinge base 102 rotate. Consequently, even when the second housing 21 rotates and stops at a certain position, a stationary state can be stably maintained.

Although not shown in FIG. 1, in order to restrict the second housing 21 from moving from the second position, another stopper hole may be formed. That is, in the second position, another stopper hole is formed in the first hinge base 101 at a point at which the stopper member 201 is located, so that it is possible to stably maintain a state where the second housing 21 stops in the second position.

Likewise, if many stopper holes are formed along the trajectory of the stopper member 201, the second housing 21 rotates with respect to the first housing 11 and can firmly maintain its own stationary state in various angle positions.

For example, if another stopper hole is formed in a position in which the second housing 21 has rotated by 60° from the first position, the first housing 11 and the second housing 21 maintain a stationary state while forming an angle of 60° therebetween. Herein, if the first housing 11 is located on the flat surface of a table, etc., the display unit 23 of the second housing 21 forms an angle of 120° with respect to the flat surface of the table. When the display unit 23 is stationary while forming an angle of 120° with respect to the flat surface of the table, a user can conveniently watch broadcasting through the terminal 10.

Hereinafter, a process in which the second housing 21 of the terminal 10 rotates from the first position to the second position will be described with reference to FIGS. 9 to 11.

Figure 9:
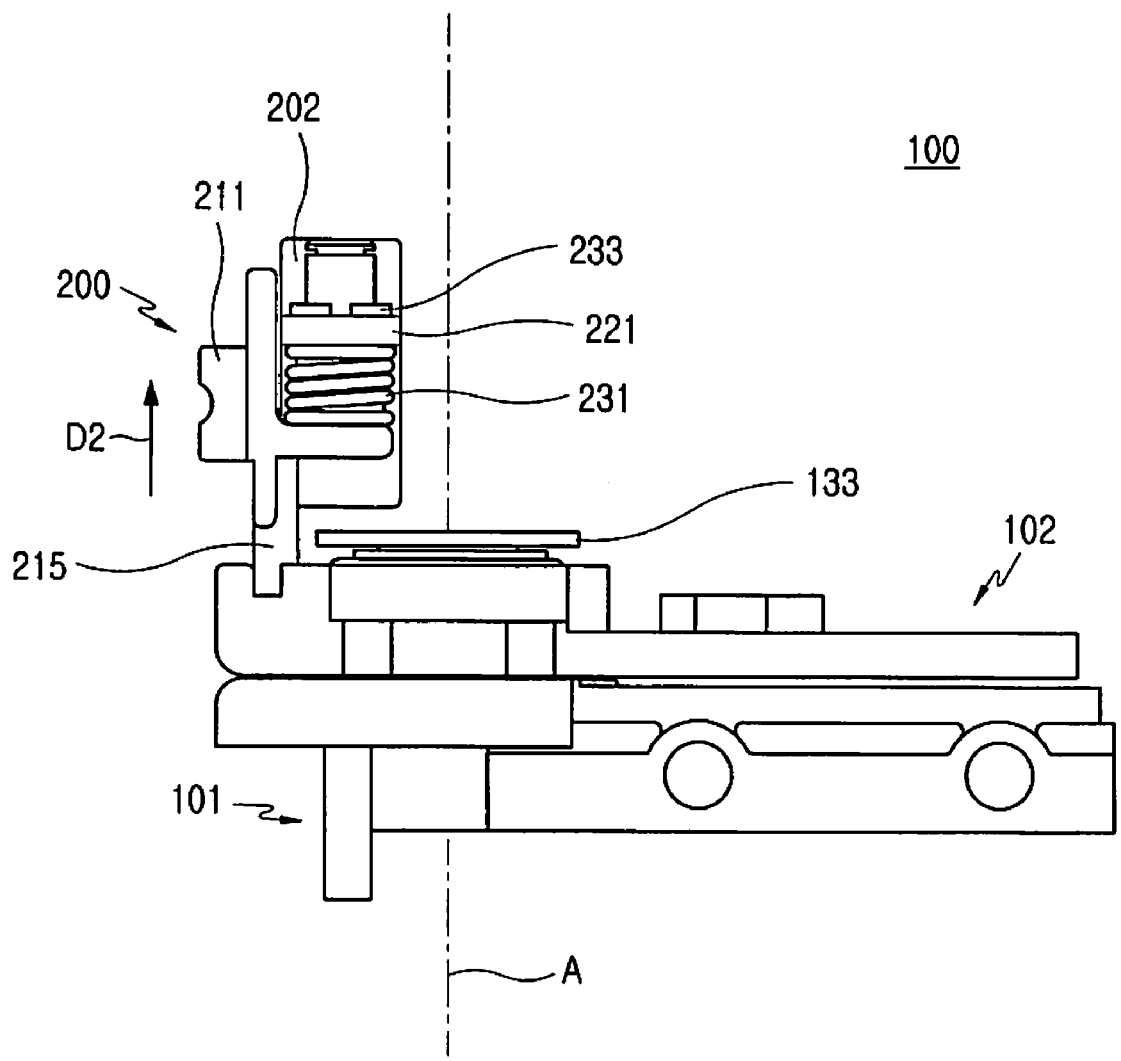
FIGS. 9 to 11 are side views sequentially showing an operation process of the hinge device shown in FIG. 5.

FIG. 9 shows the hinge device 100 when a user has moved the adjustment knob 211 in a direction D2 from the first position. If the adjustment knob 211 moves in the direction D2, an end of the stopper shaft 215 deviates from the stopper hole 115, and a user can rotate the second housing 21 as desired.

Herein, if the user releases the adjustment knob 211 while rotating the second housing 21, the adjustment knob 211 advances by the elastic force of the second elastic member 231 and thus presses the first hinge base 101. Accordingly, while the second housing 21 rotates, a friction force may occur between the stopper member 201 and the first hinge base 101.

Figure 10:
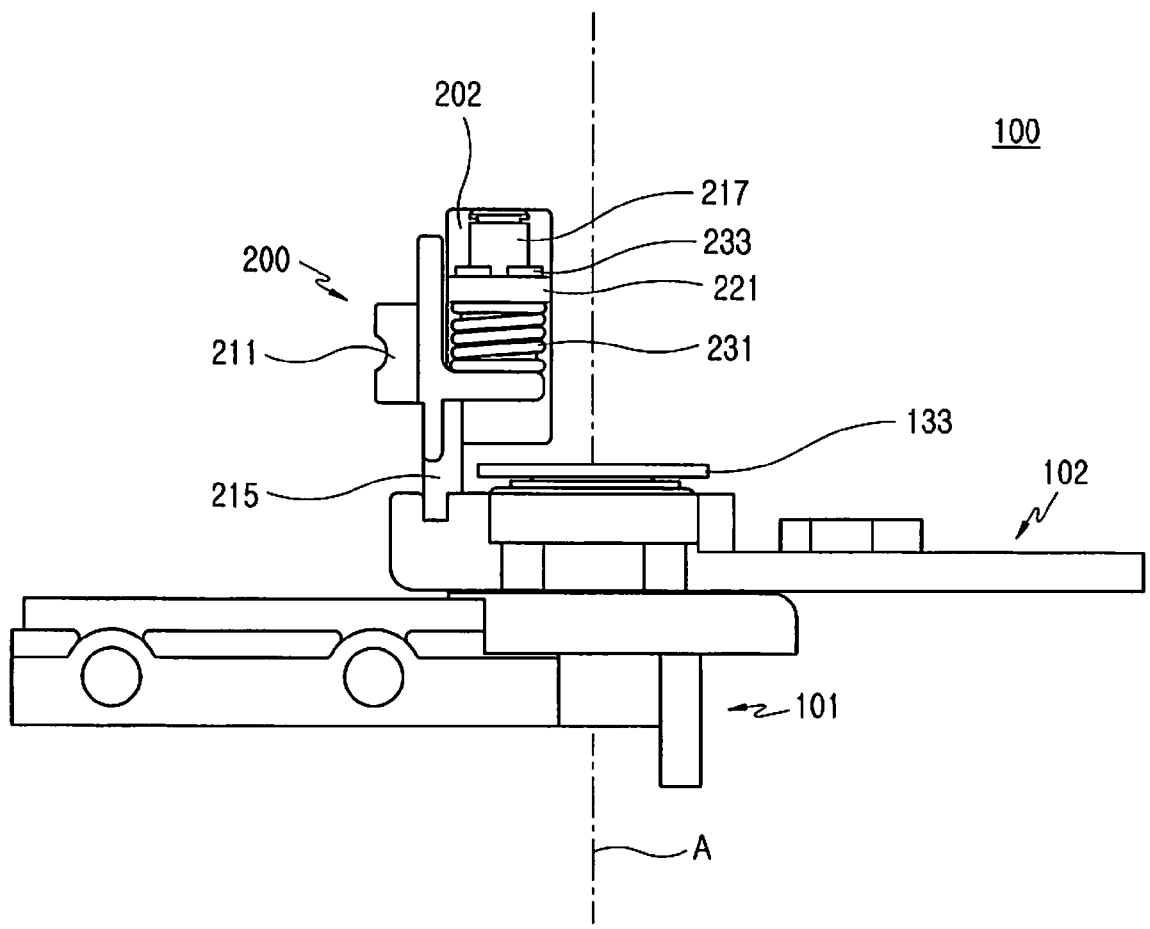

FIG. 10 shows the hinge device 100 when a user moves the second housing 21 up to the second position in a state where the adjustment knob 211 has moved in the direction D2. If the state in which the adjustment knob 211 has moved in the direction D2 is maintained, the second housing 21 can easily rotate because there is no friction force between the stopper member 201 and the first hinge base 101, as compared to when friction force occurs therebetween.

Figure 11:
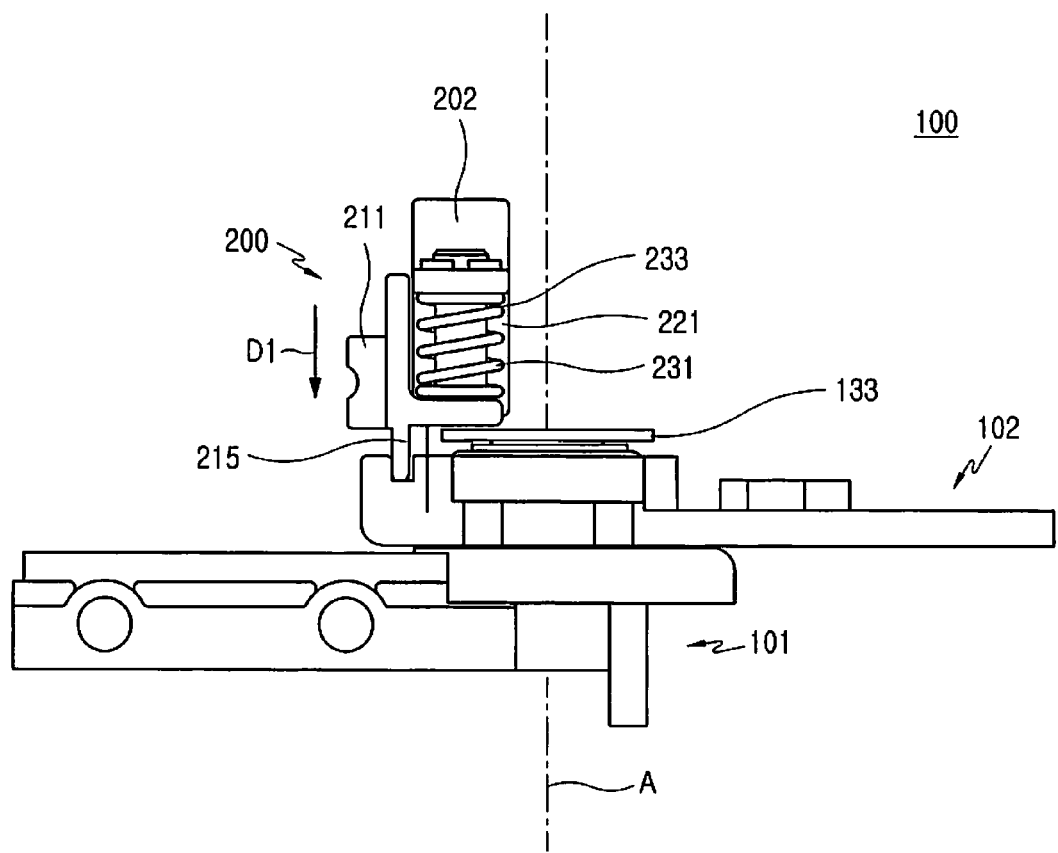

FIG. 11 shows the hinge device 100 when the adjustment knob 211 has moved in the direction D1 from the second position by the elastic force of the second elastic member 231. If the stopper member 201 presses the first hinge base 101 in the second position, the second housing 21 can stably maintain a stationary state by a static friction force between the stopper member 201 and the first hinge base 101. Further, if another stopper hole engaged with the stopper member 201 in the second position is formed, the stationary state of the second housing 21 can be more firmly maintained.

As described above, a portable terminal according to the present invention has both a hinge device, which rotatably couples one end of one housing and one end of the other housing and provides a hinge axis in the longitudinal direction of the two housings, and a hinge stopper capable of stably maintaining a stationary state therebetween according to rotation positions of one housing, so it is possible to improve the structural stability of the terminal and ensure reliability thereof. Further, since the terminal is easily inclined at an angle with respect to a plane according to rotation angles of housings thereof, it is convenient to watch broadcasting.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A portable comprising:
    a first housing provided with a display unit;
    a second housing coupled to one end of a side surface in a longitudinal direction of the first housing and rotating perpendicular to the longitudinal direction; and
    a hinge device rotatably coupling the second housing to the first housing and restraining the first housing from rotating in a stationary state in various angle positions with respect to the first housing;
    wherein the hinge device comprises:
    a first hinge base mounted on one of the first housing and the second housing;
    a second hinge base mounted on the other of the second housing and the first housing, coupled oppositely to the first hinge base, and rotating about a hinge axis; and
    a hinge stopper stopping the rotation of the second hinge base such that the hinge stopper is engaged with a stopping portion formed on the first hinge base
    wherein the first hinge base comprises:
    a first stopper hole formed in the first hinge base and located adjacent to the hinge axis, and the hinge stopper is engaged with the stopper hole when one end surface of the first housing faces one end surface of the second housing,
    wherein the first hinge base comprises both a rotation body extending along the hinge axis, and a locking segment extending perpendicularly to the hinge axis in one direction from a periphery of the rotation body, and the second hinge base has a flat board shape extending perpendicularly to the hinge axis, includes a rotation hole formed adjacent to one end of the second hinge base, and faces the locking segment as the rotation body is rotatably coupled through the rotation hole.

2. The portable terminal as claimed in claim 1, wherein the hinge axis is located adjacent to one end of the first housing.

3. The portable terminal as claimed in claim 1, wherein the rotation body is located adjacent to one end of the first hinge base, and the rotation hole is located adjacent to one end of the second hinge base.

4. The portable terminal as claimed in claim 1, wherein the hinge device comprises a locking member having a support plate formed on a first end thereof and passing through the rotation body to be supported on the first hinge base at a second end thereof, thereby coupling the first hinge base and the second hinge base.

5. The portable terminal as claimed in claim 1, wherein the hinge device comprises:
    a locking member having a support plate formed on a first end thereof and passing through the rotation body to be supported on the first hinge base at a second end thereof, thereby coupling the first hinge base and the second hinge base; and
    a first elastic member having both a first end supported by the locking member and a second end supported by the second hinge base,
    wherein the first elastic member provides an elastic force for causing the second hinge base to come into close contact with the first hinge base.

6. The portable terminal as claimed in claim 1, wherein the hinge stopper comprises:
    a stopper member provided on the first housing so it can linearly reciprocate; and
    a second elastic member for providing an elastic force to the stopper member,
    wherein the stopper member presses the first hinge base by using an elastic force from the second elastic member.

7. The portable terminal as claimed in claim 6, wherein the stopper member comprises:
- an adjustment knob;
- a first supporting segment extending from an inner side surface of the adjustment knob;
- a stopper shaft extending along the hinge axis from a first surface of the first supporting segment; and
- a supporting shaft extending in a direction opposite to the stopper shaft from a second surface of the first supporting segment,
- wherein the second elastic member is wound around a periphery of the supporting shaft.

8. The portable terminal as claimed in claim 7, wherein the adjustment knob is exposed outside the second housing.

9. The portable terminal as claimed in claim 6, wherein the hinge stopper comprises:
- a supporting member mounted inside the second housing to enable the stopper member to linearly reciprocate;
- a supporting shaft provided to the stopper member and extending along the hinge axis; and
- a C-ring coupled to one end of the supporting shaft,
- wherein the supporting shaft passes through a part of the supporting member, and the C-ring is coupled to the one end of the supporting shaft having passed through the supporting member.

10. The portable terminal as claimed in claim 9, wherein the second elastic member is wound around a periphery of the supporting shaft, and has both ends supported by the stopper member and the supporting member, respectively.

11. The portable terminal as claimed in claim 6, wherein the hinge stopper comprises:
- a supporting member mounted inside the second housing to enable the stopper member to linearly reciprocate; and
- a second supporting segment provided to one end of the supporting member,
- wherein the stopper member comprises:
- an adjustment knob exposed outside the second housing;
- a first supporting segment extending from an inner side surface of the adjustment knob;
- a stopper shaft extending along the hinge axis from a first surface of the first supporting segment;
- a supporting shaft extending in a direction opposite to the stopper shaft from a second surface of the first supporting segment; and
- a C-ring coupled to one end of the supporting shaft,
- wherein the supporting shaft passes through the second supporting segment, and the C-ring is coupled to the one end of the supporting shaft having passed through the second supporting segment.

12. The portable terminal as claimed in claim 11, wherein the second elastic member is wound around a periphery of the supporting shaft, and has both ends supported by the first supporting segment and the second supporting segment, respectively.

13. The portable terminal as claimed in claim 1, wherein, when the second hinge base rotates in a state where the hinge stopper is out of the stopper hole, the hinge stopper comes into contact with one end of the first hinge base to provide a friction force.

14. The portable terminal as claimed in claim 1, further comprising a first stopper hole formed in the first hinge base and located adjacent to the hinge axis, and a second stopper hole formed symmetrically to the first stopper hole with respect to the hinge axis,
- wherein the hinge stopper is engaged with one of the first stopper hole or the second stopper hole in both a first position in which one end surface of the first housing faces one end surface of the second housing, and a second position in which the second hinge base has rotated by 180° from the first position.

15. The portable terminal as claimed in claim 1, further comprising:
- a keypad provided on at least one surface of the first housing; and
- a display unit provided on one surface of the second housing.

16. The portable terminal as claimed in claim 1, wherein, when the second hinge base has rotated by 180° from a position in which one end surface of the first housing faces one end surface of the second housing, the first housing is located on a first side of the hinge axis and the second housing is located on a second side of the hinge axis.

* * * * *